(12) United States Patent
Okazawa

(10) Patent No.: US 9,354,834 B2
(45) Date of Patent: May 31, 2016

(54) PRINTING WITH VIRTUAL PRINTER

(71) Applicant: CANON KABUSHIKI KAISHA, Tokyo (JP)

(72) Inventor: Takashi Okazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/674,991

(22) Filed: Mar. 31, 2015

(65) Prior Publication Data

US 2015/0294198 A1 Oct. 15, 2015

(30) Foreign Application Priority Data

Apr. 15, 2014 (JP) ................................. 2014-083996

(51) Int. Cl.
*G06K 15/02* (2006.01)
*G06F 3/12* (2006.01)

(52) U.S. Cl.
CPC ............ *G06F 3/1285* (2013.01); *G06F 3/1206* (2013.01); *G06F 3/1232* (2013.01); *G06F 3/1247* (2013.01); *G06F 3/1228* (2013.01)

(58) Field of Classification Search
None
See application file for complete search history.

(56) References Cited

U.S. PATENT DOCUMENTS

| | | | | |
|---|---|---|---|---|
| 2003/0117638 | A1* | 6/2003 | Ferlitsch | G06F 3/1204 358/1.13 |
| 2007/0273919 | A1 | 11/2007 | Oomura | |
| 2012/0212773 | A1* | 8/2012 | Ciocarlie | G06F 3/1205 358/1.15 |

FOREIGN PATENT DOCUMENTS

| | | | |
|---|---|---|---|
| JP | 2004078406 A | * | 3/2004 |
| JP | 2005-309617 A | | 11/2005 |

* cited by examiner

*Primary Examiner* — Thomas D Lee
(74) *Attorney, Agent, or Firm* — Fitzpatrick, Cella, Harper & Scinto

(57) ABSTRACT

To make it possible to use a function depending on bidirectional communication, an information processing apparatus comprises: a printer driver configured to generate print data to be printed by a real printer, based on image data received from an application; and a virtual printer configured to receive the generated print data, and perform output control to the real printer. The virtual printer obtains information of the real printer by communicating with the real printer; and transmits the print data based on the information of the real printer, wherein the printer driver generates the print data by executing rendering processing on the image data based on the information of the real printer obtained via the virtual printer.

17 Claims, 9 Drawing Sheets

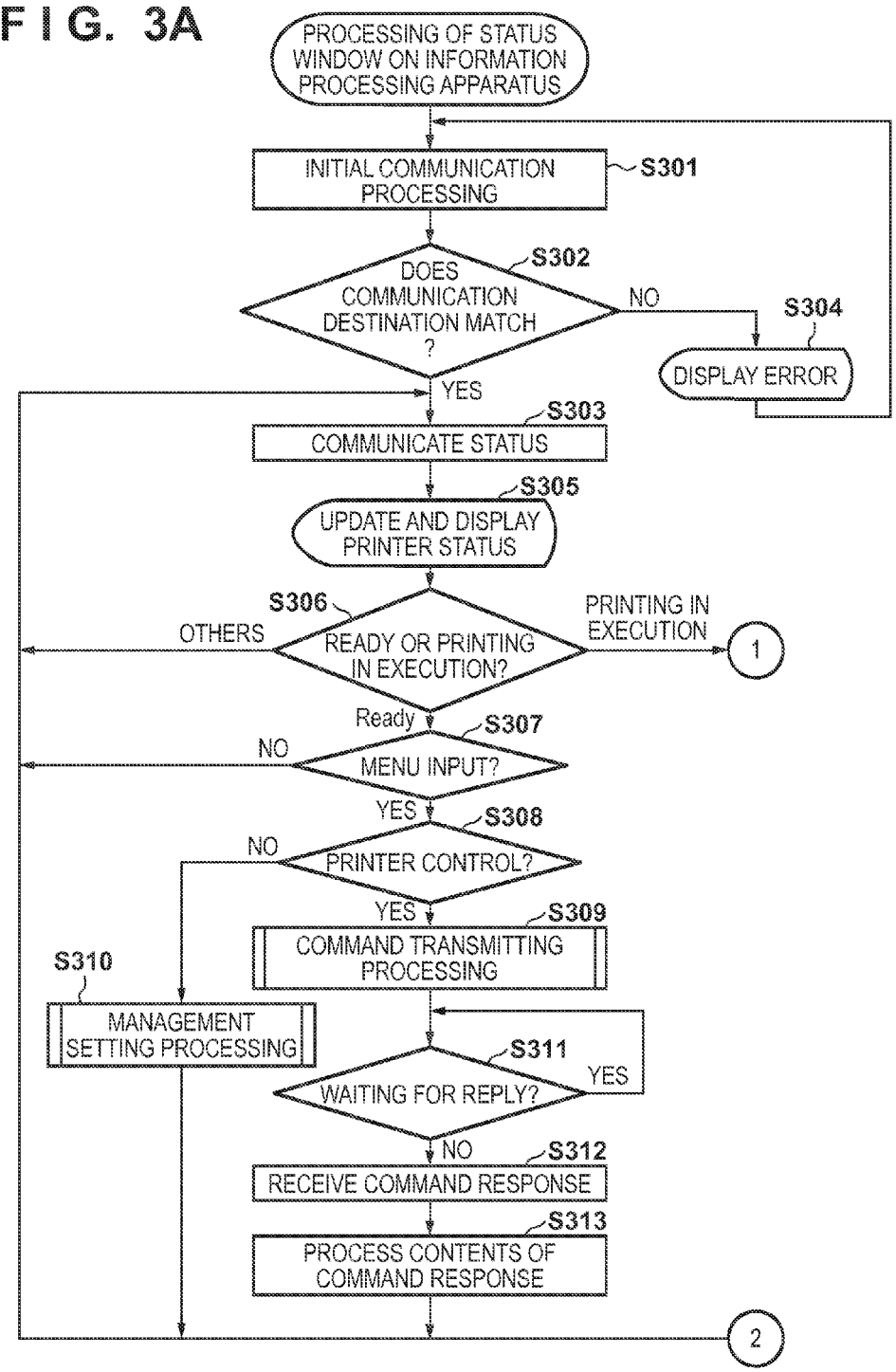

PRINTING WITH VIRTUAL PRINTER

BACKGROUND OF THE INVENTION

1. Field of the Invention

The present invention relates to an information processing apparatus for making it possible to use a function depending on bidirectional communication with an image forming apparatus, and a control method of the information processing apparatus.

2. Description of the Related Art

To use a peripheral device such as an image forming apparatus from an information processing apparatus, it is generally necessary to install a specific device driver corresponding to the peripheral device (a printer driver when the peripheral device is an image forming apparatus) in an operating system (OS) which operates on the information processing apparatus. When using the image forming apparatus, the printer driver is activated from an application, setting necessary for printing is performed, and data is output to the image forming apparatus. When outputting data from the printer driver to the image forming apparatus, an instruction for printing to paper is performed by transferring print data obtained from the application to the image forming apparatus. In communication between the image forming apparatus and printer driver, not only print data is transferred from the printer driver, but also a bidirectional communication protocol for printing communication using information from the apparatus is widely used.

This bidirectional communication protocol allows the printer driver to check a memory status. Therefore, stable printing can be executed even when using an image forming apparatus having a small memory amount. In addition, the bidirectional communication protocol allows the information processing apparatus to display status information of the image forming apparatus, and display a message to the user.

The above-described bidirectional communication protocol is also used to suppress the cost of a product. An example is a printing system in which image generation processing (rendering) is performed on an information processing apparatus instead of an image forming apparatus, and the rendered image data is transferred to the image forming apparatus. This printing system is called a host-based printing system, and capable of suppressing the cost of the image forming apparatus.

Furthermore, Japanese Patent Laid-Open No. 2005-309617 (patent literature 1) has proposed a printer adaptor which is connected to an image forming apparatus directly (by local connection) or across a network, and functions as a host apparatus.

Unfortunately, this technique proposed in above-described patent literature 1 cannot implement functions which have been implemented by using the bidirectional communication protocol. For example, it is impossible to obtain and use various kinds of information such the memory status, print image correction processing, and device information of the image forming apparatus.

SUMMARY OF THE INVENTION

According to one aspect of the present invention, an information processing apparatus which performs print output by using a real printer, comprises: a printer driver configured to generate print data to be printed by the real printer, based on image data received from an application; and a virtual printer configured to receive the print data generated by the printer driver, and perform output control to the real printer, the virtual printer comprises: an obtaining unit configured to obtain information of the real printer by communicating with the real printer; and a transmitting unit configured to transmit the print data based on the information of the real printer, wherein the printer driver generates the print data by executing rendering processing on the image data based on the information of the real printer obtained via the virtual printer.

The present invention can implement an information processing apparatus for making it possible to use a function depending on bidirectional communication with an image forming apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are flowcharts showing an example of printer information display processing;

DESCRIPTION OF THE EMBODIMENTS

Preferred embodiments of the present invention will be explained in detail below with reference to the accompanying drawings. Note that the following embodiments are merely examples, and hence are not intended to limit the scope of the invention.

First Embodiment

The first embodiment of an information processing apparatus according to the present invention will be explained below by taking an information processing apparatus which performs print output by using an image forming apparatus (real printer) as an example.

<System Configuration>

Figure 1A:
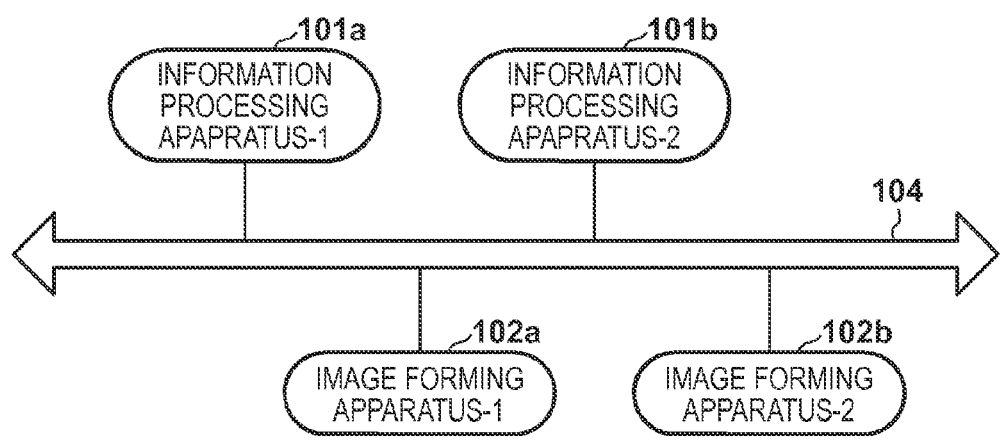
FIG. 1A is a view showing the system configuration of the first embodiment.

FIG. 1A is a block diagram showing an outline of the configuration of a network system according to the first embodiment. This network system includes one or more information processing apparatuses 101a, 101b, . . . , and one or more image forming apparatuses 102a, 102b, . . . , which perform printing by receiving print data from the information processing apparatuses 101. These apparatuses are connected across a network 104 such as Ethernet®.

Figure 1B:
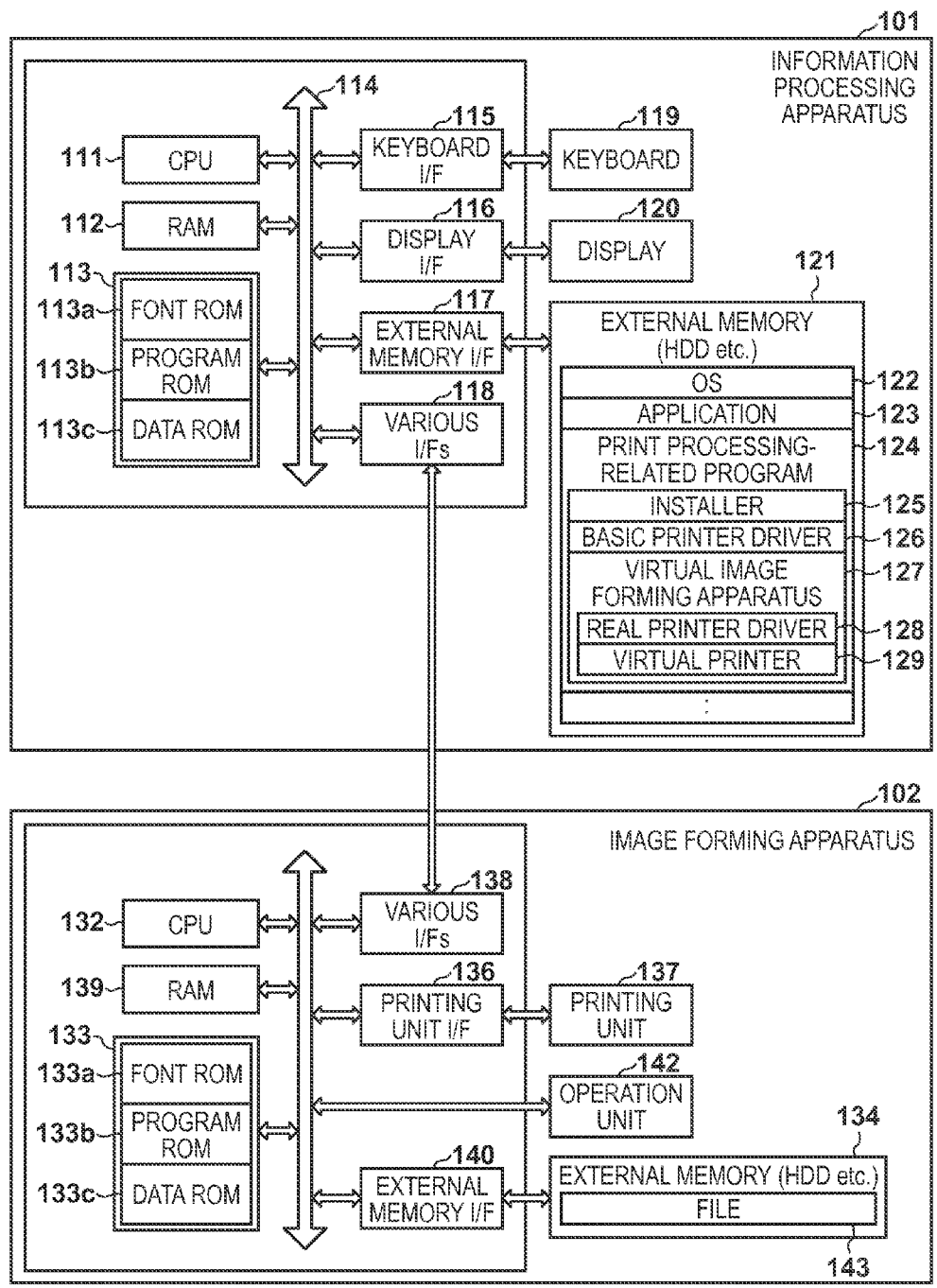
FIG. 1B is a block diagram showing the internal arrangement of each apparatus in the system.

FIG. 1B is a block diagram showing the internal arrangements of the information processing apparatus 101 and image forming apparatus 102. In the information processing apparatus 101, a CPU 111 comprehensively controls each device connected to a system bus 114 in accordance with a program stored in a RAM 112. The RAM 112 also functions as, for example, a main memory and work memory of the CPU 111. A ROM 113 stores various programs and data.

A keyboard I/F 115 controls key inputs from a keyboard 119 and a pointing device (for example, a touch panel) (not shown). A display I/F 116 controls display to a display 120. An external memory I/F 117 controls access to an external memory 121 such as a flash memory or SSD (Solid State Drive). The external memory 121 stores an operating system (OS) 122, various application programs 123, and a print processing-related program 124. The external memory 121 also functions as a storage medium which stores, for example, user files (not shown) and edit files and is readable by the information processing apparatus. Note that Windows® of Microsoft Corp., U.S.A. is used as the OS 122.

The print processing-related program 124 contains an installer 125, basic printer driver 126, and virtual image forming apparatus (virtual printer) 127. The basic printer driver 126 is driver software which can be installed in accordance with a target image forming apparatus 102. The virtual image forming apparatus 127 is driver software including a virtual printer function 129 and real printer driver function 128.

The real printer driver function 128 supports a bidirectional communication method with respect to the image forming apparatus 102. Various I/Fs (mainly a network I/F and USB I/F) 118 are connected to the image forming apparatus 102 via the network 104 or a local bus such as a USB, and perform communication control processing with respect to the image forming apparatus 102. The virtual printer function 129 is emulator software for implementing a device which behaves like a physical image forming apparatus on the OS and controls output to the real printer.

<Functional Configuration>

Figure 6:
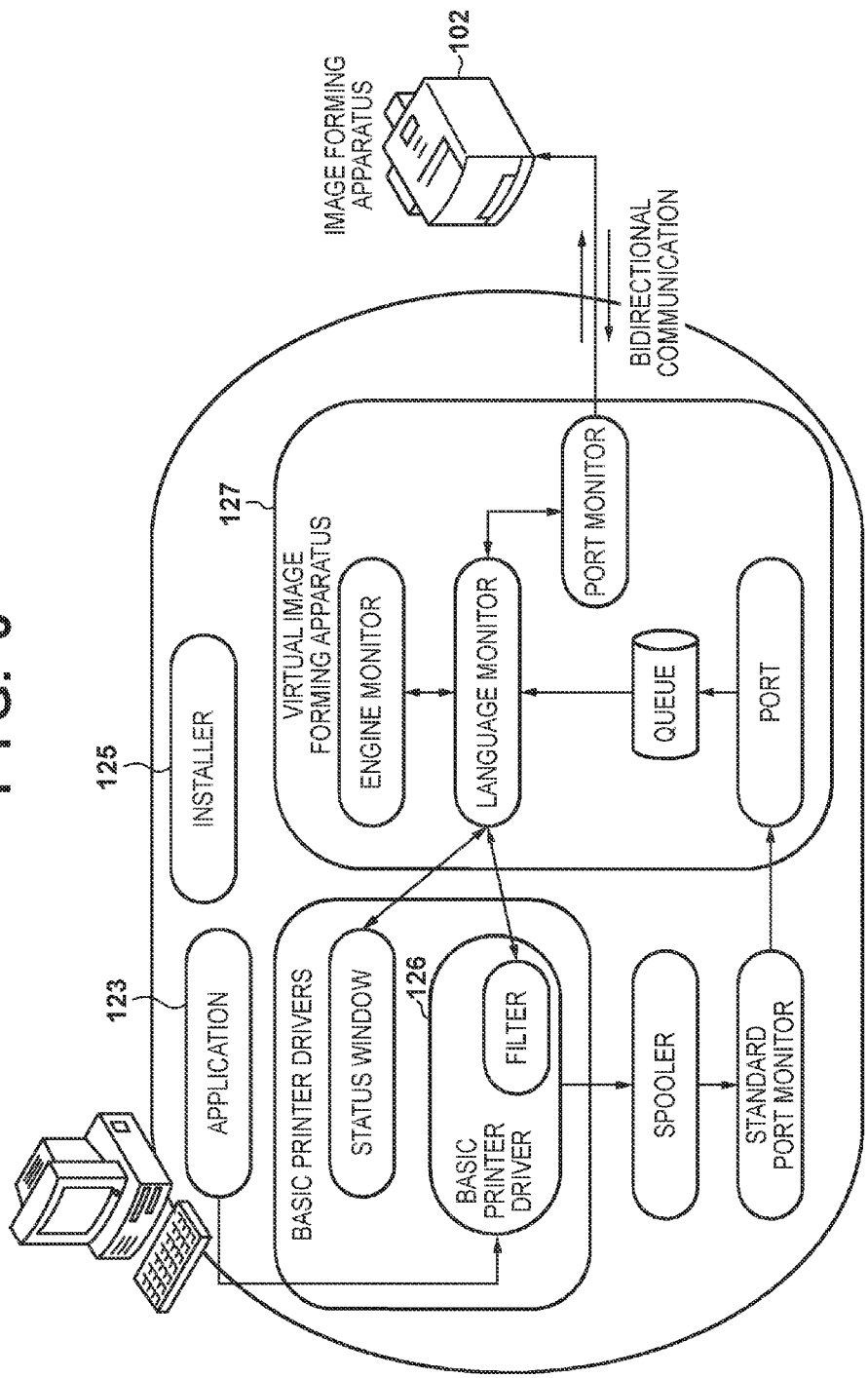
FIG. 6 is a block diagram showing a system configuration.

FIG. 6 is a software functional block diagram showing the print processing-related program 124 in the information processing apparatus 101.

When the application program 123 to be used by the user instructs start of printing in the information processing apparatus, the basic printer driver 126 is called, and print data to be printed by the real printer is formed and transferred to a printing spooler function in the OS 122. This print data on the spooler is transmitted to the virtual image forming apparatus 127 through a standard port monitor of the OS. The virtual image forming apparatus 127 receives the print data from the port and stores the received data in a queue. The print data stored in the queue is transferred to a language monitor. The language monitor transmits the print data to the image forming apparatus 102 via a port monitor while exchanging information with an engine monitor.

Note that the queue of the virtual image forming apparatus 127 is implemented as functional unit different from a standard queue of the OS 122. The queue of the virtual image forming apparatus 127 is queued when the print data is transmitted to the virtual image forming apparatus 127, and the standard queue of the OS 122 is queued when the print data is transmitted to the spooler. In the following explanation, the queue of the virtual image forming apparatus 127 will simply be called a queue unless otherwise specified.

Also, the language monitor receives status information of the image forming apparatus 102 by bidirectional communication, and notifies, for example, the engine monitor of this status information. A status window exchanges information with the language monitor, and displays, for example, the status of the information processing apparatus 102. The installer 125 is a program for installing the print processing-related program 124 in the information processing apparatus 101.

The arrangement of the image forming apparatus 102 will now be explained. A CPU 132 controls the overall operation of the image forming apparatus 102. A RAM 139 functions as, for example, a main memory and work memory of the CPU 132, and is also used as an output information mapping area and environmental data storage area. In addition, the RAM 139 includes a non-volatile RAM, and can increase the memory capacity by an optional RAM connected to an expansion port. A ROM 133 includes a font ROM 133a storing various fonts, a program ROM 133b storing, for example, a control program to be executed by the CPU 132, and a data ROM 133c storing various kinds of data.

Various I/Fs (mainly a network I/F and USB I/F) 138 exchange data with the information processing apparatus 101. A printing unit I/F 136 controls the interface with a printing unit 137 as an image forming engine.

An external memory I/F 140 controls access to an external memory 134. The external memory 134 includes a hard disk (HD), SSD (Solid State Drive), or the like connected as an option, and stores font data, form data, and the like. The external memory 134 can also store a file 143 which is temporarily formed in the image forming apparatus, and used to exchange information with an external device. Note that when the external memory 134 such as a hard disk is not connected, information and the like to be used in the information processing apparatus 101 are stored in the data ROM 133c of the ROM 133. Note also that the number of the external memory 134 is not limited to 1, and a plurality of memories may also be used. For example, it is also possible to connect a plurality of external memories storing an optional font card in addition to a built-in font, a program for interpreting a printer control language belonging to a different language system, and the like.

An operation unit 142 includes an operation panel for accepting operations by the user, and operation switches, LED indicators, and the like (none of them is shown) are arranged on the operation panel. The operation unit 142 may also include an NVRAM (not shown) and store printer mode setting information from the operation panel. The CPU 132 outputs an image signal as output information to the printing unit 137 via the printing unit I/F 136 based on the control program and the like stored in the program ROM 133b of the ROM 133. The CPU 132 can also communicate with the information processing apparatus 101 via the various I/Fs (mainly a network I/F or USB I/F) 138. This forms a bidirectional communication path through which print data transmitted from the information processing apparatus 102 can be received, and the information processing apparatus 101 can be notified of, for example, internal information of the image forming apparatus 101. The information (real printer information) of the image forming apparatus 102 contains parameter information (to be described later) and status information (to be described later).

<Operation of System>

Figure 2:
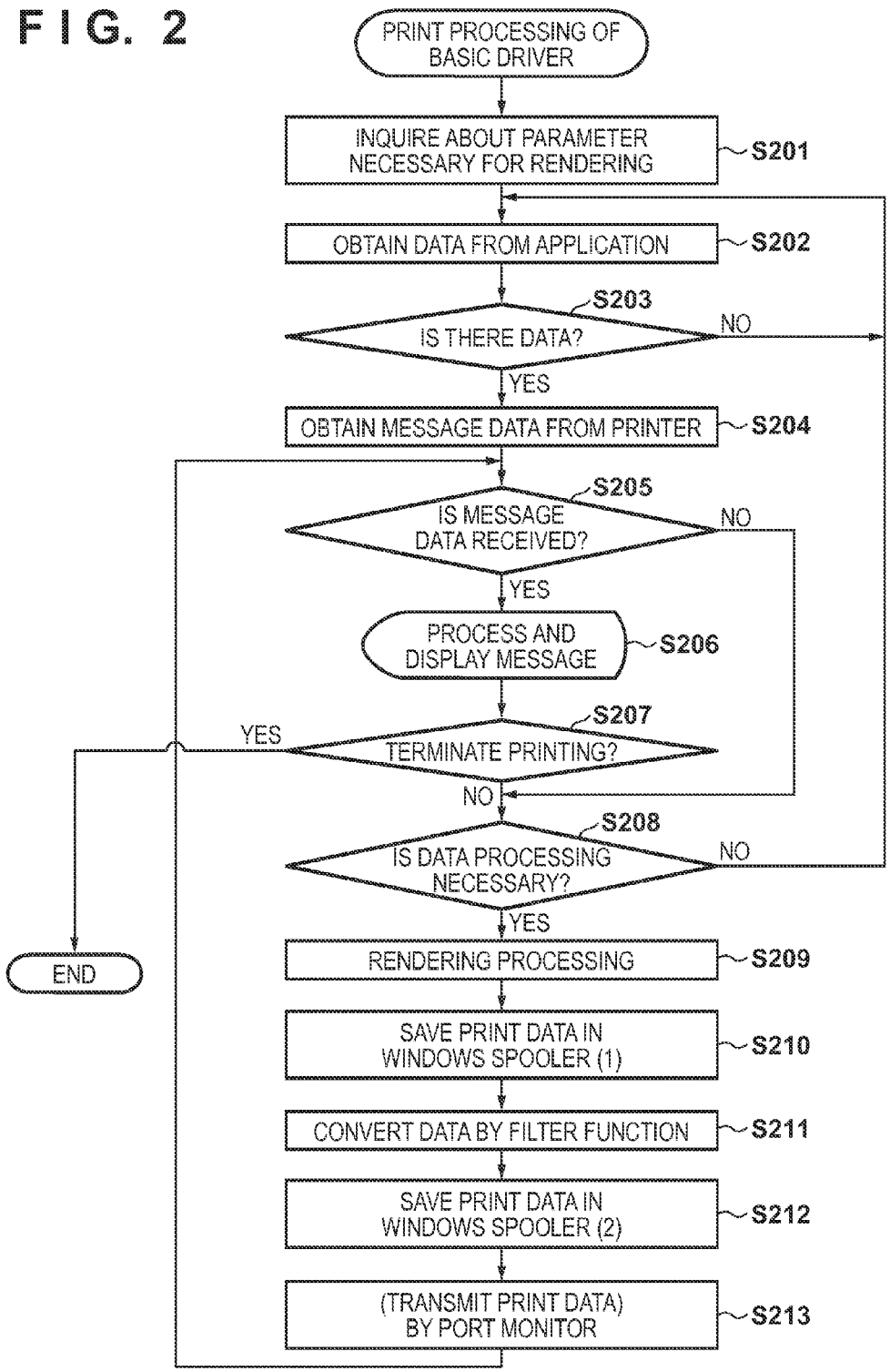
FIG. 2 is a flowchart showing an example of print processing of a basic printer driver.

FIG. 2 is a flowchart showing an example of the print processing of the basic printer driver 126. First, in initial processing after start, the basic printer driver 126 obtains a parameter (parameter information) for the print processing, which exists on the image forming apparatus (step S201). This is a parameter necessary for later image rendering processing. The parameter is obtained by communicating with the language monitor of the virtual image forming apparatus via the filter functional unit in the basic printer driver shown in FIG. 6. That is, the result of response in steps S411 and S412 (to be described later) is received. Note that if the parameter cannot be obtained, a printing defect such as insufficient image correction may occur. In this case, the image rendering processing is continued by using a given default value.

Then, in steps S202 and S203, the basic printer driver 126 waits until print data (image data) is input from the application. Assume that this print data from the application has an XPS (XML Paper Specification) data format. If the print data is input, the process advances to step S204.

In step S204, the basic printer driver 126 receives message data from the virtual image forming apparatus in the subsequent stage. This message data from the subsequent stage is, for example, a message indicating the completion of print data reception. Whether the message data to be processed has been received is determined in step S205. If the message data has not been received, the process advances to step S208. If the message data has been received, the process advances to step S206.

In step S206, the basic printer driver 126 performs processing such as display corresponding to the type of message (a detailed explanation of the type of message will be omitted). One type of message is "termination of print processing". In this case, it is determined to terminate the processing in step S207, and the process advances to the termination of driver processing. YES is also determined in step S207 when abnormal termination occurs. If NO in step S207, the process advances to step S208, and the basic printer driver 126 determines whether the received print data requires the rendering processing. If the rendering processing is unnecessary, the process returns to step S202 to further receive data from the application. On the other hand, if the rendering processing is necessary, the process advances to step S209.

In step S209, the basic printer driver 126 performs the rendering processing by using the obtained parameter. In step S210, the basic printer driver 126 saves the rendering processing result in the spooler provided by the OS. After that, in step S211, the basic printer driver 126 performs, by using the filter function, data conversion to a print data format interpretable by the image forming apparatus which actually performs printing. This conversion is performed on the spooler (step S212). That is, the converted print data is saved on the spooler. After this conversion processing, in step S213, the basic printer driver 126 requests the standard port monitor to transmit the print data. When this print data transmission has ended, the process returns to step S205 to further transmit the next print data, and the message processing, rendering processing, conversion processing, and data transmission are repetitively performed.

Figure 3B:
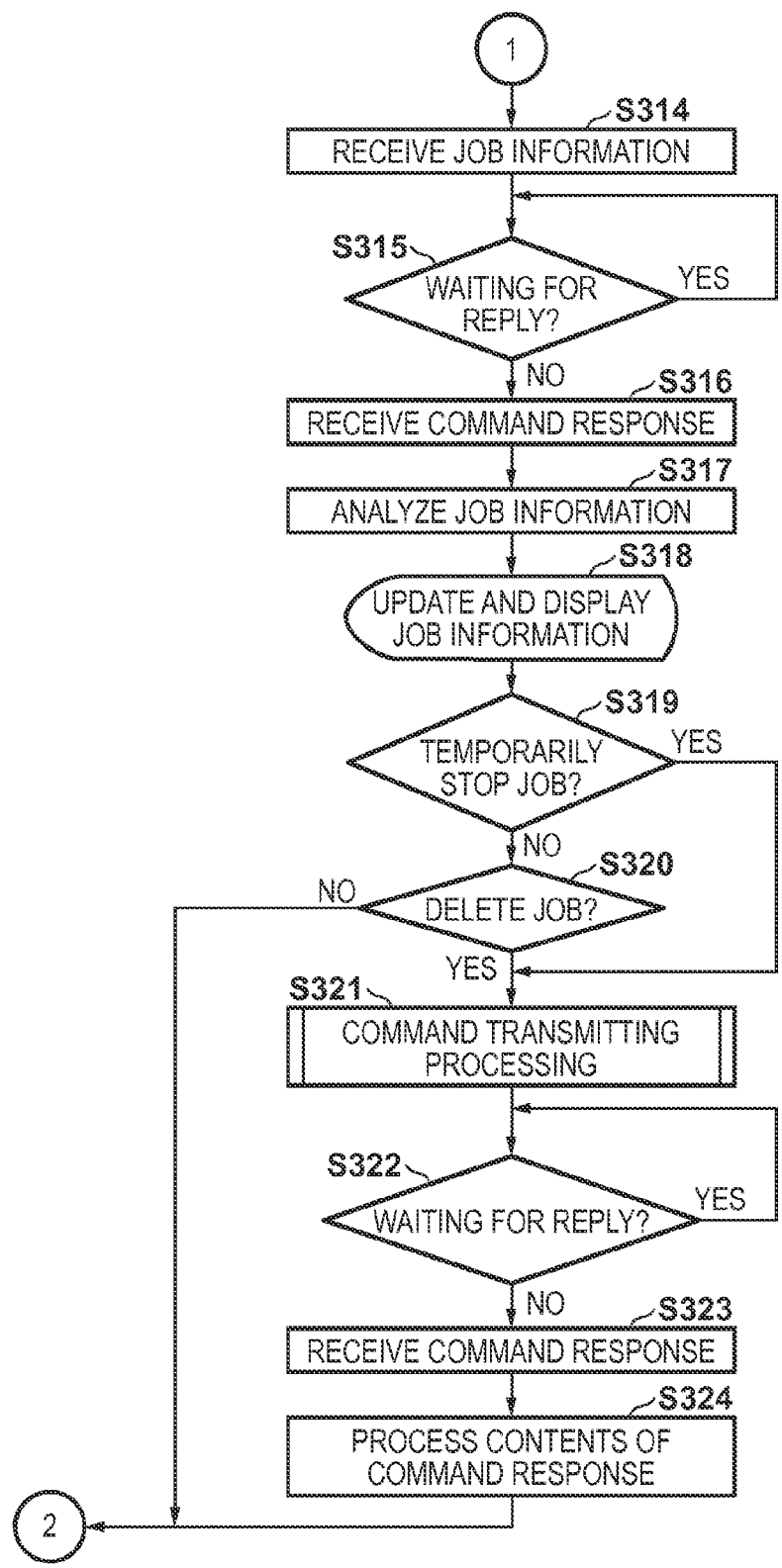

FIGS. 3A and 3B are flowcharts showing an example of processing executed by the status window which displays the status of the information processing apparatus 102. After start, the status window of the basic printer driver 126 performs initial communication processing (step S301), and determines whether an image forming apparatus in the communication destination of the status window is correct (step S302). More specifically, the status window determines whether the model name of an image forming apparatus to be emulated by the virtual image forming apparatus 127 matches that of an image forming apparatus on which the status window performs display. If the model name is not correct, the status window performs error display indicating that the models of the image forming apparatuses do not match (step S304), and returns the initial communication processing in step S301. The status window repeats the above-mentioned processing until the model name becomes correct. If the model names match in step S302, the process advances to step S303, and the status window performs status communication for obtaining the status information of the image forming apparatus.

In step S305, the basic printer driver 126 updates the status information display in accordance with the obtained status. If the status is a ready state, the basic printer driver 126 performs display control which makes it possible to manage the image forming apparatus. On the other hand, if the management is impossible, the basic printer driver 126 performs, for example, gray-out display. Control is also performed such that the management setting of the display function itself of the basic printer driver 126 can be performed by a menu operation. Ready state determination is performed in step S306. If the status is the ready state, the process advances to step S307 to determine whether menu input is performed. If it is determined in step S307 that menu input is performed, the process advances to step S308. If the menu input is management control (printer control) of the image forming apparatus, the process advances to step S309, and a command for controlling the image forming apparatus in accordance with the operation menu is transmitted.

If it is determined in step S308 that the menu operation is the display function management of the status window itself, the process advances to step S310, and the status window of the basic printer driver 126 refers to or sets a display function management item and reflects the setting. After that, the process returns to the status display in step S303. On the other hand, if the process advances to step S309 and the printer control command is transmitted, the status window waits for a response to the printer control command from the device in step S311. If the response comes, the status window performs response receiving processing in step S312, and performs processing corresponding to the command response result in step S313. This processing corresponding to the response result is to, for example, display a result to the setting. For example, if an error is returned in the setting, a request for help is displayed.

Also, if it is determined in step S306 that printing is in execution, the basic printer driver 126 enables a job operation during printing. In step S314, the status window transmits a command to the language monitor in order to obtain information (processing status) about the print job in execution. If a response to the command is returned (step S316), the process advances to step S317. In step S317, the status window analyzes the response information. In step S318, the status window displays various kinds of detailed information of the job. In addition, the status window analyzes the menu input (accepting means), and determines whether a temporary job stop operation is received (step S319) or whether a job delete operation is received (step S320). In step S321, the status window transmits a job operation command corresponding to the menu operation to the language monitor. That is, the status window designates a control target job, and accepts the instruction contents of control to the job.

In step S322, the status window waits for a command response. If the response is received (step S323), the status window performs processing corresponding to the response in step S324. After that, the status window returns to step S303 and updates the status. Note that if NO is determined in step S320, there is no menu input, so the status window returns to step S303 and updates the status.

Figure 4A:
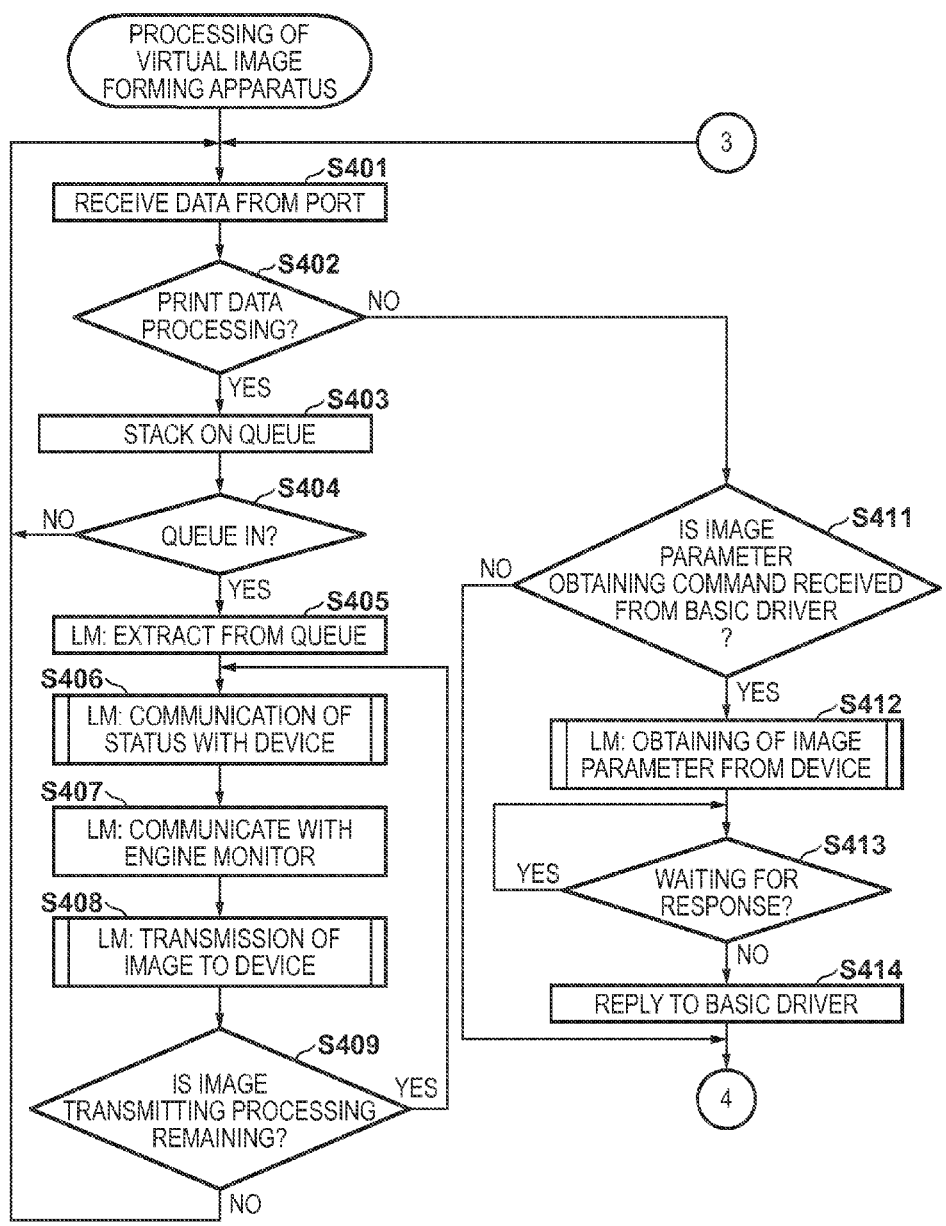
FIGS. 4A and 4B are flowcharts showing an example of processing of a virtual image forming apparatus.
Figure 4B:
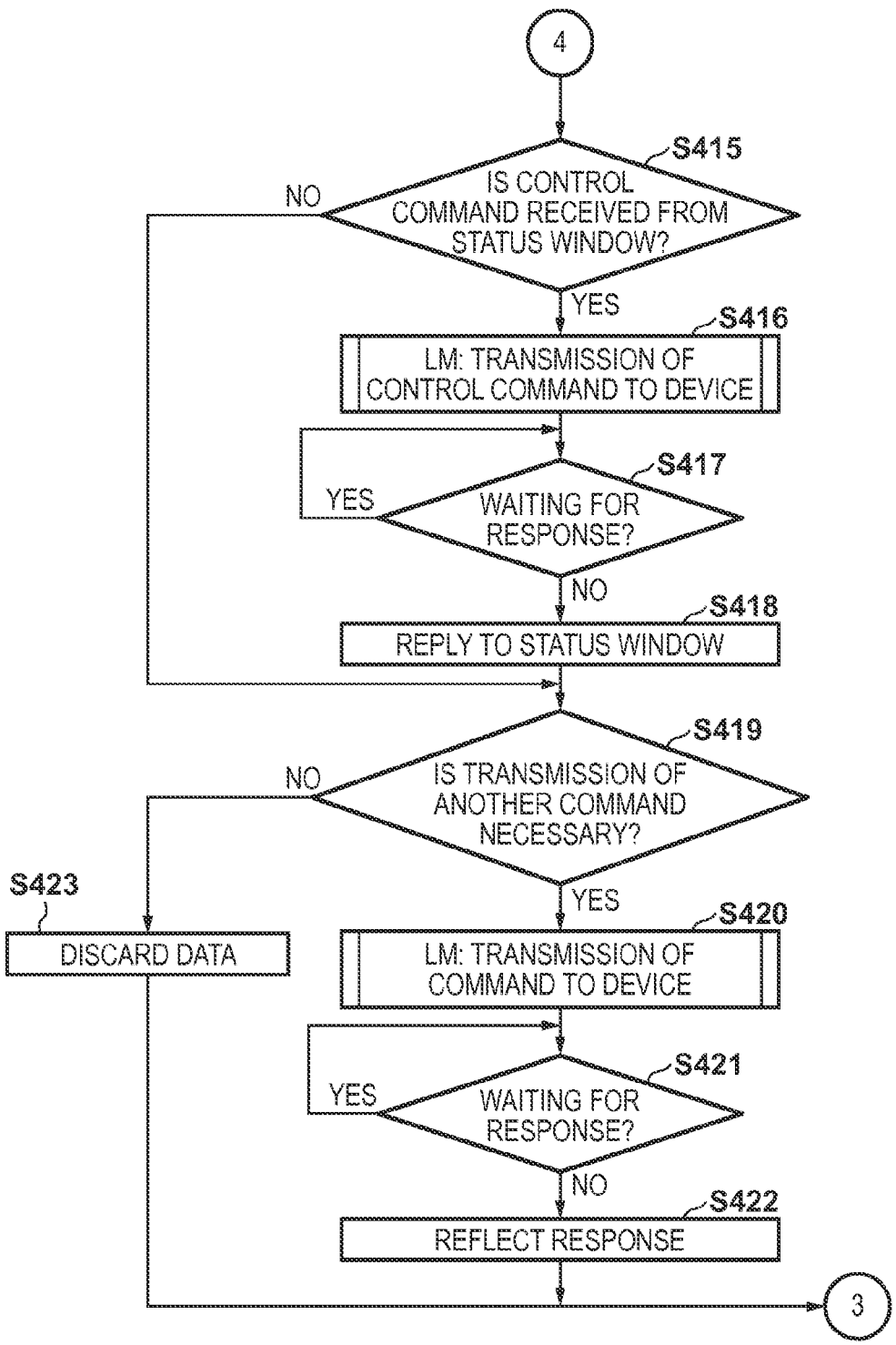

FIGS. 4A and 4B are flowcharts showing an example of the processing of the virtual image forming apparatus.

In step S401, the virtual image forming apparatus 127 receives data from the port. In step S402, the virtual image forming apparatus 127 determines whether print data to be processed is received. If it is determined that print data is received, the virtual image forming apparatus 127 stores the data in the queue in step S403. Note that the queue is sometimes unable to receive input data at once, and divisionally receives the input data in that case. Note also that the input data is print data to be printed in this explanation, but a virtual WSD (Web Services for Devices) printer responds to a web service as a WSD printer function as well (not shown).

Then, if there is no data to be processed on the queue, the virtual image forming apparatus 127 returns to the data input processing in step S401. If data exists on the queue, the process advances to step S405, the data is extracted from the queue, and processing as a virtual image forming apparatus is started. In step S406, the language monitor of the virtual image forming apparatus 127 performs bidirectional communication with the real image forming apparatus (real printer), and obtains status information as the information of the real image forming apparatus. The language monitor transmits the obtained status information to the engine monitor (step S407), and receives information from the engine monitor. In step S408, the language monitor transmits an image matching the engine status of the real image forming apparatus. After that, the language monitor performs remaining image processing in cooperation with the engine monitor, and repeats the processing until printing is finally complete (step S409). When printing is complete, the process returns to step S401.

If it is determined in step S402 that there is no print data from the port, the process advances to step S411, and the virtual image forming apparatus 127 determines whether a parameter obtaining command is received from the filter functional unit of the basic driver. If no parameter obtaining command is received, the process advances to step S415. If the parameter obtaining command is received, the process advances to step S412, and the virtual image forming apparatus 127 transmits the parameter obtaining command to the real image forming apparatus. Then, the virtual image forming apparatus 127 waits for a response from the real image forming apparatus (step S413). If a response from the real image forming apparatus is received, the virtual image forming apparatus 127 performs return processing to the basic driver in step S414, and advances to step S415.

In step S415, the language monitor of the virtual image forming apparatus 127 determines whether an image forming apparatus management control (printer control) command is received from the status window. If it is determined that the command is received, the language monitor analyzes the contents of the command, and transmits a control command corresponding to the analysis result to the real image forming apparatus (step S416). Subsequently, the virtual image forming apparatus 127 waits for a response to the command from the real image forming apparatus (step S417). If the response from the real image forming apparatus is received, the virtual image forming apparatus 127 transfers (transmits) the contents of the response to the status window in step S418. Then, the process advances to step S419, and the virtual image forming apparatus 127 determines whether there is data to be transmitted to the real image forming apparatus. If data exists, the process advances to step S420; if not, the process advances to step S421.

In step S420, the virtual image forming apparatus 127 performs command transmission processing of transmitting a command to the real image forming apparatus. In step S421, the virtual image forming apparatus 127 waits for a response to the command from the real image forming apparatus. If the response is obtained, the process advances to step S422, and the virtual image forming apparatus 127 reflects the response in it. After that, the process returns to step S401. Note that if data which is not a command to be processed has arrived in step S421, the data is discarded, and the process returns to step S401.

Figure 5:
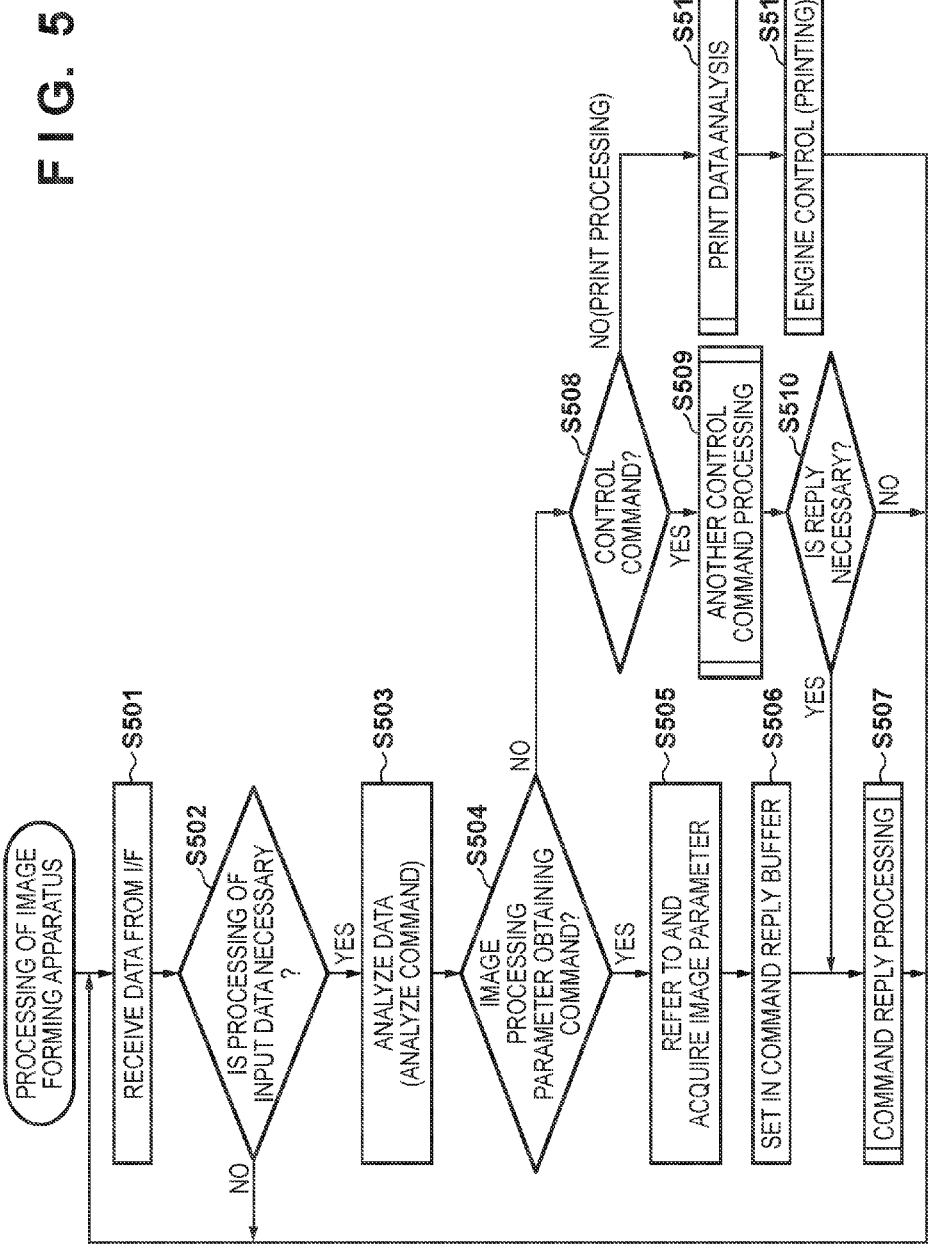
FIG. 5 is a flowchart showing an example of processing of an image forming apparatus.

FIG. 5 is a flowchart showing an example of the print processing of the image forming apparatus (real printer) 102. The image forming apparatus 102 receives data input from the information processing apparatus 101 in step S501, and determines the input data in step S502. If the image forming apparatus 102 determines that the input data requires processing, the process advances to step S503. If not, the image forming apparatus 102 further waits for input data. In this step, meaningless data may also be discarded. Note that the data is input as a command format recognizable by the image forming apparatus.

In step S503, the image forming apparatus 102 analyzes a command of the input data, and performs processing corresponding to the analytical result. First, if it is determined in step S504 that the command is a parameter obtaining command, the image forming apparatus 102 refers to and acquires an image correction parameter of the image forming apparatus itself (step S505). Then, the image forming apparatus 102 sets the acquired parameter in a buffer area for replying to the obtaining command (step S506), and performs reply in command reply processing (step S507). After that, the image forming apparatus 102 returns to data input waiting in step S501.

If the command is not the parameter obtaining command but a printing apparatus control command (for example, apparatus setting reference or execution, or apparatus status reference) in step S504, the image forming apparatus 102 determines the control command in step S508, and performs processing corresponding to the control command in step S509. Note that there is a command type requiring no response. In that case, the image forming apparatus 102 determines NO in step S510, and returns to data input waiting step S501. If YES is determined in step S510, the image forming apparatus 102 performs the reply processing in step S507. After that, the image forming apparatus 102 returns to data input waiting in step S501.

Note that if the input data is found to be print data (including a print command) by the analysis in step S503, the process advances to step S511, and the image forming apparatus 102 analyzes the print data, and executes print processing in addition to control (step S512) of the developer (engine) of the image forming apparatus. After printing is complete, the image forming apparatus 102 returns to data input waiting in step S501.

In the first embodiment as has been explained above, the virtual image forming apparatus in the information processing apparatus (virtual printer) performs bidirectional communication with the image forming apparatus (real printer), and obtains a parameter required to form print data from the image forming apparatus. Accordingly, even the basic printer driver incapable of direct bidirectional communication with the image forming apparatus can obtain the parameter of the image forming apparatus via the virtual image forming apparatus. This makes it possible to generate suitable print data using the parameter.

Even when using the basic printer driver, therefore, it is possible to use a function depending on bidirectional communication with the image forming apparatus. Also, even for a print job completely processed by the basic printer driver, it is possible to perform status display or control via the virtual image forming apparatus. Accordingly, a function depending on bidirectional communication can be used even if the mechanism of the OS has changed and as a consequence the mechanism of bidirectional communication with the image forming apparatus has changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083996, filed Apr. 15, 2014, which is hereby incorporated by reference herein in its entirety.

What is claimed is:

1. An information processing apparatus which performs print output by using a real printer, comprising:
at least one processor functioning as:
a printer driver configured to generate print data to be printed by said real printer, based on image data received from an application; and
a virtual printer configured to receive the print data generated by said printer driver, and perform output control to said real printer,
said virtual printer comprising:
an obtaining unit configured to obtain information of said real printer by communicating with said real printer; and
a transmitting unit configured to transmit the print data based on the information of said real printer,
wherein said printer driver generates the print data by executing rendering processing on the image data based on the information of said real printer obtained via said virtual printer.

2. The apparatus according to claim 1, wherein
the information contains parameter information to be used by an image processing engine of said real printer, and
said printer driver executes the rendering processing by using the parameter information.

3. The apparatus according to claim 1, wherein
the information contains information pertaining to a processing status of the print data in said real printer, and
said printer driver further comprises a display unit configured to display the processing status of the print data in said real printer.

4. The apparatus according to claim 3, wherein
said printer driver further comprises an accepting unit configured to accept an instruction for the print data to be processed by said real printer, and
said virtual printer further comprises:
a receiving unit configured to receive the instruction from said printer driver; and
a control unit configured to control an operation of said real printer based on the instruction received by said receiving unit.

5. The apparatus according to claim 4, wherein said accepting unit accepts, as the instruction, designation of one print data contained in not less than one print data to be processed by said real printer, and contents of an instruction for the designated one print data.

6. The apparatus according to claim 4, wherein the instruction contains one of temporary stop and delete of processing of the print data.

7. The apparatus according to claim 1, wherein
said printer driver generates print data having a first format from the image data, and
said virtual printer generates print data having a second format interpretable by said real printer, based on the print data having the first format received from said printer driver.

8. The apparatus according to claim 1, wherein
said printer driver is configured to output the generated print data to a spooler provided by an OS, and
said virtual printer is configured to receive the print data from said printer driver via said spooler.

9. A control method of an information processing apparatus which performs print output by using a real printer, wherein
the information processing apparatus comprises:
a printer driver configured to generate print data to be printed by the real printer, based on image data received from an application; and
a virtual printer configured to receive the print data generated by the printer driver, and perform output control to the real printer,
the control method comprises:
obtaining, by the virtual printer, information of the real printer by communicating with the real printer; and
transmitting, by the virtual printer, the print data based on the information of the real printer, and
the printer driver is configured to generate the print data by executing rendering processing on the image data based on the information of the real printer obtained via the virtual printer.

10. The method according to claim 9, wherein
the information contains parameter information to be used by an image processing engine of the real printer, and
the printer driver executes the rendering processing by using the parameter information.

11. The method according to claim 9, wherein
the information contains information pertaining to a processing status of the print data in the real printer, and
the control method further comprises displaying, by the printer driver, the processing status of the print data in the real printer.

12. The method according to claim 11, further comprising:
accepting, by the printer driver, an instruction for the print data to be processed by the real printer;
receiving, by the virtual printer, the instruction from the printer driver; and
controlling, by the virtual printer, an operation of the real printer based on the instruction received in the receiving.

13. The method according to claim 12, wherein the accepting accepts, as the instruction, designation of one print data contained in not less than one print data to be processed by the real printer, and contents of an instruction for the designated one print data.

14. The method according to claim 12, wherein the instruction contains one of temporary stop and delete of processing of the print data.

15. The method according to claim 9, wherein
the printer driver generates print data having a first format from the image data, and
the virtual printer generates print data having a second format interpretable by the real printer, based on the print data having the first format received from the printer driver.

16. The method according to claim 9, wherein
the printer driver is configured to output the generated print data to a spooler provided by an OS, and
the virtual printer is configured to receive the print data from the printer driver via the spooler.

17. A non-transitory computer-readable recording medium storing a program for causing a computer to function as an information processing apparatus which performs print output by using a real printer, wherein
the program causes said information processing apparatus to function as:
a printer driver configured to generate print data to be printed by said real printer, based on image data received from an application; and
a virtual printer configured to receive the print data generated by said printer driver, and perform output control to said real printer,
the program further causes said virtual printer to function as:
an obtaining unit configured to obtain information of said real printer by communicating with said real printer; and
a transmitting unit configured to transmit the print data based on the information of said real printer, and
said printer driver generates the print data by executing rendering processing on the image data based on the information of said real printer obtained via said virtual printer.

* * * * *